United States Patent
Ambrose et al.

(10) Patent No.: US 10,538,345 B2
(45) Date of Patent: Jan. 21, 2020

(54) HEAT PIPE WITH AXIAL WICK

(71) Applicant: Lockheed Martin Corporation, Bethesda, MD (US)

(72) Inventors: Jay H. Ambrose, Saratoga, CA (US); Rolland Holmes, Menlo Park, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 973 days.

(21) Appl. No.: 14/973,540

(22) Filed: Dec. 17, 2015

(65) Prior Publication Data
US 2016/0102921 A1   Apr. 14, 2016

Related U.S. Application Data

(62) Division of application No. 13/682,615, filed on Nov. 20, 2012, now Pat. No. 9,315,280.

(51) Int. Cl.
| | | |
|---|---|---|
| *B64G 1/50* | (2006.01) | |
| *F28D 15/02* | (2006.01) | |
| *F28D 15/04* | (2006.01) | |

(52) U.S. Cl.
CPC ............ *B64G 1/503* (2013.01); *B64G 1/506* (2013.01); *F28D 15/0241* (2013.01); *F28D 15/0275* (2013.01); *F28D 15/04* (2013.01); *F28D 15/046* (2013.01)

(58) Field of Classification Search
CPC .. F28D 15/00; F28D 15/0241; F28D 15/0275; F28D 15/04; F28D 15/046; H05K 7/20; B64G 1/00; B64G 1/503; B64G 1/506

USPC ............ 165/46, 104.11, 104.26; 361/679.01, 361/679.46, 679.52, 688, 700

See application file for complete search history.

(56) References Cited

U.S. PATENT DOCUMENTS

| | | | | |
|---|---|---|---|---|
| 3,604,504 A | * | 9/1971 | Kessler, Jr. | ........... F28D 15/046 |
| | | | | 165/104.26 |
| 3,661,202 A | | 5/1972 | Moore, Jr. | |
| 3,822,743 A | * | 7/1974 | Waters | ................... B21D 53/02 |
| | | | | 122/366 |

(Continued)

FOREIGN PATENT DOCUMENTS

| | | | |
|---|---|---|---|
| EP | 0438938 A2 | 7/1991 | |
| EP | 2051032 A1 * | 4/2009 | ......... F28D 15/0233 |
| JP | 2000-274972 A | 10/2000 | |

OTHER PUBLICATIONS

Extended European Search Report from European Application No. 13856511.4, dated Mar. 14, 2017.

(Continued)

*Primary Examiner* — Keith M Raymond
*Assistant Examiner* — Gustavo A Hincapie Serna
(74) *Attorney, Agent, or Firm* — Morgan, Lewis & Bockius LLP (57) ABSTRACT

A heat pipe has an evaporator portion, a condenser portion, and at least one flexible portion that is sealingly coupled between the evaporator portion and the condenser portion. The flexible portion has a flexible tube and a flexible separator plate held in place within the flexible tube so as to divide the flexible tube into a gas-phase passage and a liquid-phase artery. The separator plate and flexible tube are configured such that the flexible portion is flexible in a plane that is perpendicular to the separator plate.

13 Claims, 7 Drawing Sheets

(Section A-A)

(56) References Cited

U.S. PATENT DOCUMENTS

| | | | |
|---|---|---|---|
| 3,844,342 A | 10/1974 | Eninger et al. | |
| 3,857,441 A | 12/1974 | Arcella | |
| 3,865,184 A * | 2/1975 | Grover | B21C 37/205 |
| | | | 165/104.26 |
| 4,040,478 A | 8/1977 | Pogson et al. | |
| 4,170,262 A | 10/1979 | Marcus et al. | |
| 4,351,388 A * | 9/1982 | Calhoun | F28D 15/046 |
| | | | 165/104.26 |
| 4,440,215 A | 4/1984 | Grover et al. | |
| 4,441,548 A | 4/1984 | Franklin et al. | |
| 4,463,798 A | 8/1984 | Pogson et al. | |
| 4,470,450 A | 9/1984 | Bizzell et al. | |
| 4,470,451 A * | 9/1984 | Alario | F28D 15/0233 |
| | | | 122/366 |
| 4,520,865 A | 6/1985 | Bizzell | |
| 4,903,761 A | 2/1990 | Cima | |
| 4,951,740 A | 8/1990 | Peterson et al. | |
| 5,117,901 A | 6/1992 | Cullimore | |
| 5,346,000 A | 9/1994 | Schlitt | |
| 5,360,058 A | 11/1994 | Koeppl et al. | |
| 6,719,040 B2 * | 4/2004 | Sugito | F28D 15/0266 |
| | | | 165/104.21 |
| 6,863,117 B2 * | 3/2005 | Valenzuela | F28D 15/0233 |
| | | | 165/104.21 |
| 7,392,836 B2 * | 7/2008 | Wong | F28D 15/0233 |
| | | | 165/104.26 |
| 7,647,961 B2 | 1/2010 | Thayer et al. | |
| 7,650,931 B2 * | 1/2010 | Siu | F28D 15/0233 |
| | | | 165/104.26 |
| 7,770,631 B2 * | 8/2010 | Wang | F28D 15/046 |
| | | | 165/104.21 |
| 8,611,089 B2 * | 12/2013 | Mizuta | F28D 15/0233 |
| | | | 165/104.21 |
| 8,813,834 B2 * | 8/2014 | Chin | F28D 15/025 |
| | | | 165/104.26 |
| 8,997,839 B2 * | 4/2015 | Yang | F28D 15/046 |
| | | | 165/104.19 |
| 2002/0020518 A1 * | 2/2002 | Li | F28D 15/0233 |
| | | | 165/104.11 |
| 2006/0201655 A1 * | 9/2006 | Hong | F28D 15/046 |
| | | | 165/104.26 |
| 2007/0240587 A1 * | 10/2007 | Fengler | B41F 17/10 |
| | | | 101/35 |
| 2007/0240857 A1 * | 10/2007 | Hou | F28D 15/046 |
| | | | 165/104.26 |
| 2007/0251673 A1 | 11/2007 | Hou et al. | |
| 2010/0006268 A1 * | 1/2010 | Meyer, IV | F28D 15/0233 |
| | | | 165/104.26 |
| 2011/0011565 A1 * | 1/2011 | Hou | F28D 15/0233 |
| | | | 165/104.26 |
| 2011/0048341 A1 * | 3/2011 | Zhang | F22B 1/28 |
| | | | 122/366 |
| 2011/0088874 A1 | 4/2011 | Meyer, IV et al. | |
| 2011/0168359 A1 * | 7/2011 | Lin | F28D 15/0233 |
| | | | 165/104.26 |
| 2011/0172576 A1 * | 7/2011 | Castro | A61F 5/03 |
| | | | 602/19 |
| 2011/0315351 A1 * | 12/2011 | Meyer, IV | F28D 15/046 |
| | | | 165/104.26 |
| 2013/0048248 A1 | 2/2013 | Lin et al. | |
| 2014/0138059 A1 | 5/2014 | Ambrose et al. | |

OTHER PUBLICATIONS

International Search Report for Application No. PCT/US2013/070898, dated Apr. 14, 2014, 2 pgs.

Celgia, Enrico, et al., "Summary Review of the European Space Agency's Low Gravity Experiments," Erasmus Centre, ESA, Jul. 2007, UC-ESA-SRE-0001, vol. 3, Rev 0.

Goncharov, Konstantin, et al., "Development of low-temperature arterial heat pipes," presented at International Two-Phase Thermal Control Technology Workshop, Los Angeles, Mar. 7-9, 2005.

Kaya, Tarik, et al., "Investigation of the Thermal Performance Characteristics of a Variable Conductance Arterial Heat Pipe," Frontiers in Heat Pipes (FHP), 2011.

Leitch, Rob, et al., "Transient Response of a Flexible High-Performance Variable Conductance Heat Pipe," SAE International, 2009-01-2500 ISSN 0148-7191.

Streckert, Liz, et al., "Steady State Performance Results for a Flexible High-Performance Variable Conductance Heat Pipe," SAE International, 2009-01-2502, ISSN 0148-1791.

Extended European Search Report from European Patent Application No. 19160542.7, dated Jun. 7, 2019, 10 pages.

* cited by examiner

FIG. 6A
(Section A-A)

FIG. 6B
(Section B-B)

FIG. 6C
(Section C-C)

FIG. 6D
(Section D-D)

FIG. 6E
(Section F-F)

FIG. 12B
(Section G-G)

FIG. 12C
(Section H-H)

FIG. 13A

FIG. 13B

HEAT PIPE WITH AXIAL WICK

CROSS-REFERENCE TO RELATED APPLICATIONS

This application is a divisional of U.S. patent application Ser. No. 13/682,615, which is hereby incorporated by reference herein in its entirety.

STATEMENT REGARDING FEDERALLY SPONSORED RESEARCH OR DEVELOPMENT

This invention was made with government support under Contract No. NASW-4884 awarded by the National Aeronautics and Space Administration (NASA). The government has certain rights in the invention.

BACKGROUND

Field

The present invention generally relates to heat-transfer systems and, in particular, to a bendable heat pipe having an axial wick insert.

Description of the Related Art

In conventional heat pipes, a liquid-phase working fluid is provided to an evaporator whereupon the working fluid extracts heat from the evaporator and is converted to a vapor-phase by evaporation. The vapor-phase working fluid is conveyed to a condenser wherein the working fluid rejects heat to a heat sink by condensation and is thereby returned to the liquid-phase.

Some conventional heat pipes, particularly heat pipes intended for use in low-gravity environments utilize arteries, i.e. channels, to provide capillary pressure to circulate the liquid-phase working fluid from the condenser to the evaporator. Some low-gravity heat pipes provide arterial wicks wherein the arteries carrying the liquid-phase working fluid are separated from the gas-phase region by a capillary-scale slot or a fine-weave mesh. Conventional arterial heat pipes, however, are susceptible to bubble-induced failures and, in addition, may fail to prime properly in a low-gravity environment. Bubbles may form in the liquid working fluid, such bubbles being particularly persistent in the presence of non-condensable gases, i.e. gases other than the heat pipe working fluid, that may be present as impurities or may evolve by chemical reaction during operation of the heat pipe.

Certain conventional arterial heat pipes may provide one or more wicks as an insert within the gas-phase region of the heat pipe. Wick inserts having machined structures may have limited flexibility, thereby presenting a challenge for use in deployable heat management systems, and inserted wick inserts having porous structures may have substantially lower heat transport capabilities, thereby presenting a challenge for use in a high-performance system such as may be required on space vehicles.

SUMMARY

The present invention generally relates to heat-transfer systems and, in particular, to a bendable heat pipe having an axial wick insert.

It is desirable to provide a high-transport heat pipe for use in a low-gravity environment without sensitivity to blockage of liquid arteries by gas bubbles. It may also be desirable to provide a high-transport heat pipe having a flexible portion(s) allowing for deployment of one or more attached sections such as a radiator assembly coupled to the condenser portion. It may also be desirable to provide such a heat pipe to provide mechanical isolation between elements of sensitive instruments. In an example envisioned application, a deployed radio frequency (RF) payload wing may transfer excess heat through a flexible heat pipe to the spacecraft radiators.

In certain embodiments, a heat pipe is disclosed that includes an evaporator portion, a condenser portion, and at least one flexible portion sealingly coupled between the evaporator portion and the condenser portion. The at least one flexible portion includes a flexible tube having a plurality of inner contact points and a flexible separator plate comprising two lateral edges that are disposed proximate to the inner contact points of the tube so as to divide the interior volume into a gas-phase passage and a liquid-phase artery. The separator plate has a first plane that passes through the two lateral edges when the separator plate is flat. The separator plate and flexible tube are configured such that the at least one flexible portion is flexible at least in a second plane that is perpendicular to the first surface.

In certain embodiments, an evaporator portion of a heat pipe is disclosed that includes a tube comprising an interior volume with an inner surface and a centerline, a separator plate disposed within the tube and comprising two lateral edges that are proximate to the inner surface of the tube so as to divide the interior volume into a gas-phase passage and a liquid-phase artery, and a vent hole formed through the separator plate so as to connect the gas-phase passage to the liquid-phase artery. The vent hole has a diameter that is greater than or equal to a diameter of the largest circle that can be inscribed within the liquid-phase artery in a cross-section of the tube taken perpendicular to the centerline.

In certain embodiments, an evaporator portion of a heat pipe is disclosed that includes a tube comprising an interior volume with an inner surface and a separator plate disposed within the tube and comprising two lateral edges that are proximate to the inner surface of the tube so as to divide the interior volume into a gas-phase passage and a liquid-phase artery. The separator plate includes a plurality of tabs projecting toward the gas-phase passage from both of the lateral edges of the separator plate. Each tab has a tip that is proximate to the inner surface of the tube. The tabs are configured to urge the separator plate downward so as to maintain the two lateral edges proximate to the inner surface of the tube.

In certain embodiments, an evaporator portion of a heat pipe is disclosed that includes a tube comprising an interior volume with an inner surface, a separator plate disposed within the tube and comprising two lateral edges that are proximate to the inner surface of the tube so as to divide the interior volume into a gas-phase passage and a liquid-phase artery, and a splitter disposed within the liquid-phase artery in contact with the separator plate and the inner surface of the tube so as to divide the liquid phase artery into a plurality of liquid-phase subarteries.

In certain embodiments, a condenser portion of a heat pipe is disclosed that includes a tube comprising an interior volume with an inner surface and a separator plate disposed within the tube, the separator plate comprising two lateral edges that are proximate to the inner surface of the tube so as to divide the interior volume into a gas-phase passage and a liquid-phase artery. The separator plate also has a first portion having a constant size of the gas-phase passage and a second portion that is inclined within the tube and configured such that the gas phase passage becomes larger toward an outermost end of the tube.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The present invention generally relates to heat-transfer systems and, in particular, to a bendable heat pipe having an axial wick insert.

The following description discloses embodiments of a heat pipe that is particularly adapted for use on a spacecraft in a low-gravity environment. In certain embodiments, the heat pipe includes a flexible section allowing a radiator assembly to be deployed thereby improving the heat rejection capability of the radiator assembly.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Figures 1, 2:
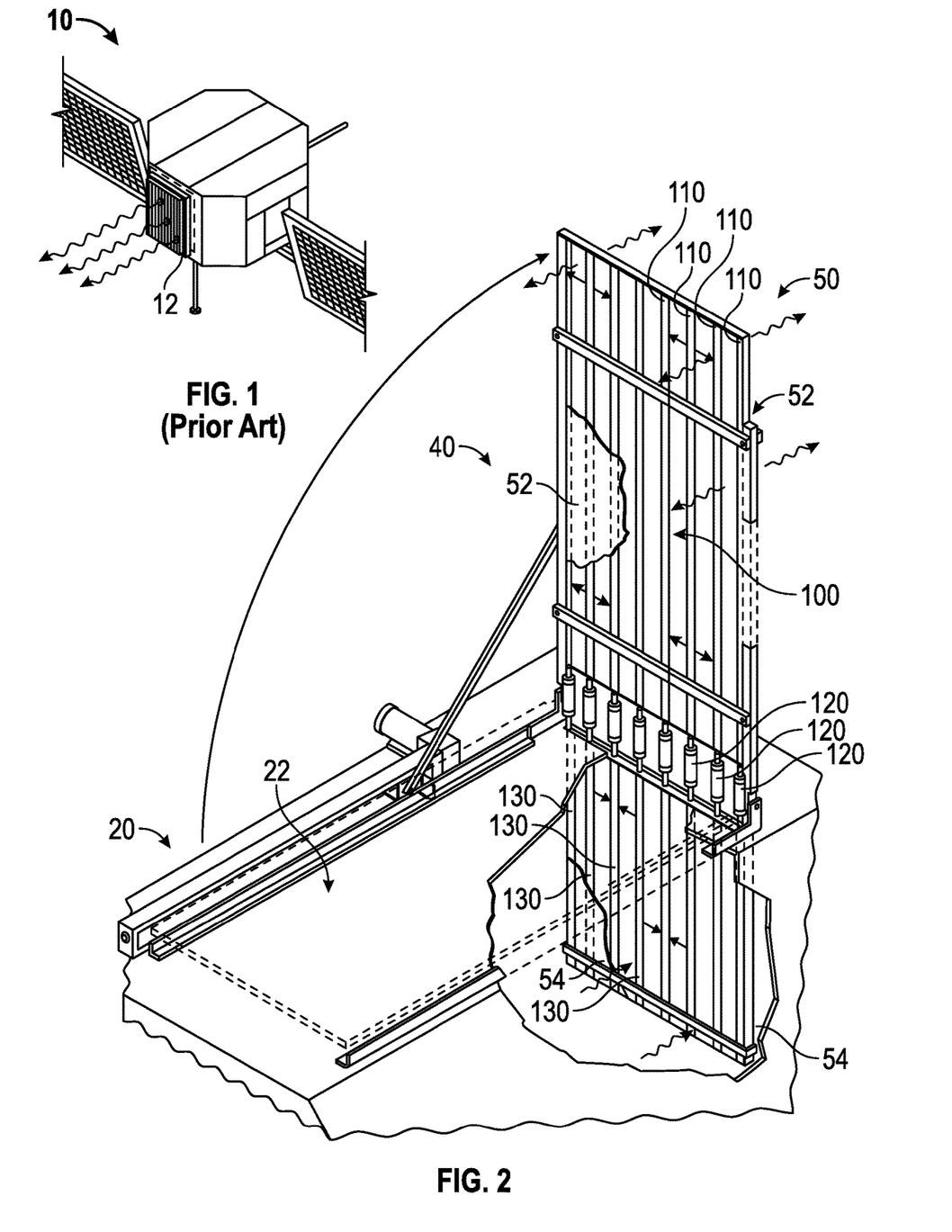
FIG. 1 depicts a spacecraft using a conventional fixed heat pipe radiator.
FIG. 2 depicts a deployable radiator that is coupled to a plurality of exemplary heat pipes according to certain aspects of the present disclosure.

FIG. 1 depicts a spacecraft 10 using a conventional fixed heat pipe radiator 12. The radiator 12 can reject heat in only a single direction away from the body of the spacecraft 10, as the opposite side of the radiator 12 is facing the spacecraft itself.

FIG. 2 depicts a deployable radiator 50 that is coupled to a plurality of exemplary heat pipes 100 according to certain aspects of the present disclosure. The radiator 50 is part of a heat management system 40 of the spacecraft 20. The flexible heat pipes 100 enable the condenser portion 110 to extend away from a stowed position to a deployed position extending away from the spacecraft. The radiator 50 is stowed in recess 22 at launch and then deployed after the spacecraft 20 is in orbit. The heat pipes 100 each comprise a condenser portion 110 coupled to radiation panels 52 on both sides, where the panel 52 on the near side has been cut away to reveal the condenser portions 110. The radiator panels 52 are configured to distribute the heat from the condenser portions 110 across the surface of the panel 52 and effectively radiate the heat to an external heat sink, for example deep space, using principles known to those of skill in the art. With a panel 52 on each side, the heat rejection capability of the radiator 50 may be greater than the single-sided radiator 12 of FIG. 1. The heat pipes 100 each also comprise an evaporator portion 130 coupled to a cold plate 54 on both sides, in this example, where the panel 54 on the near side has been cut away to reveal the evaporator portions 130. The panels 54 absorb heat from internal components (not shown in FIG. 2) and transfer the heat to the evaporator portions 130. The condenser portions 110 and evaporator portions 130 are connected by flexible portions 120, the construction of which is discussed in greater detail with respect to FIG. 5.

Figures 3, 4, 5:
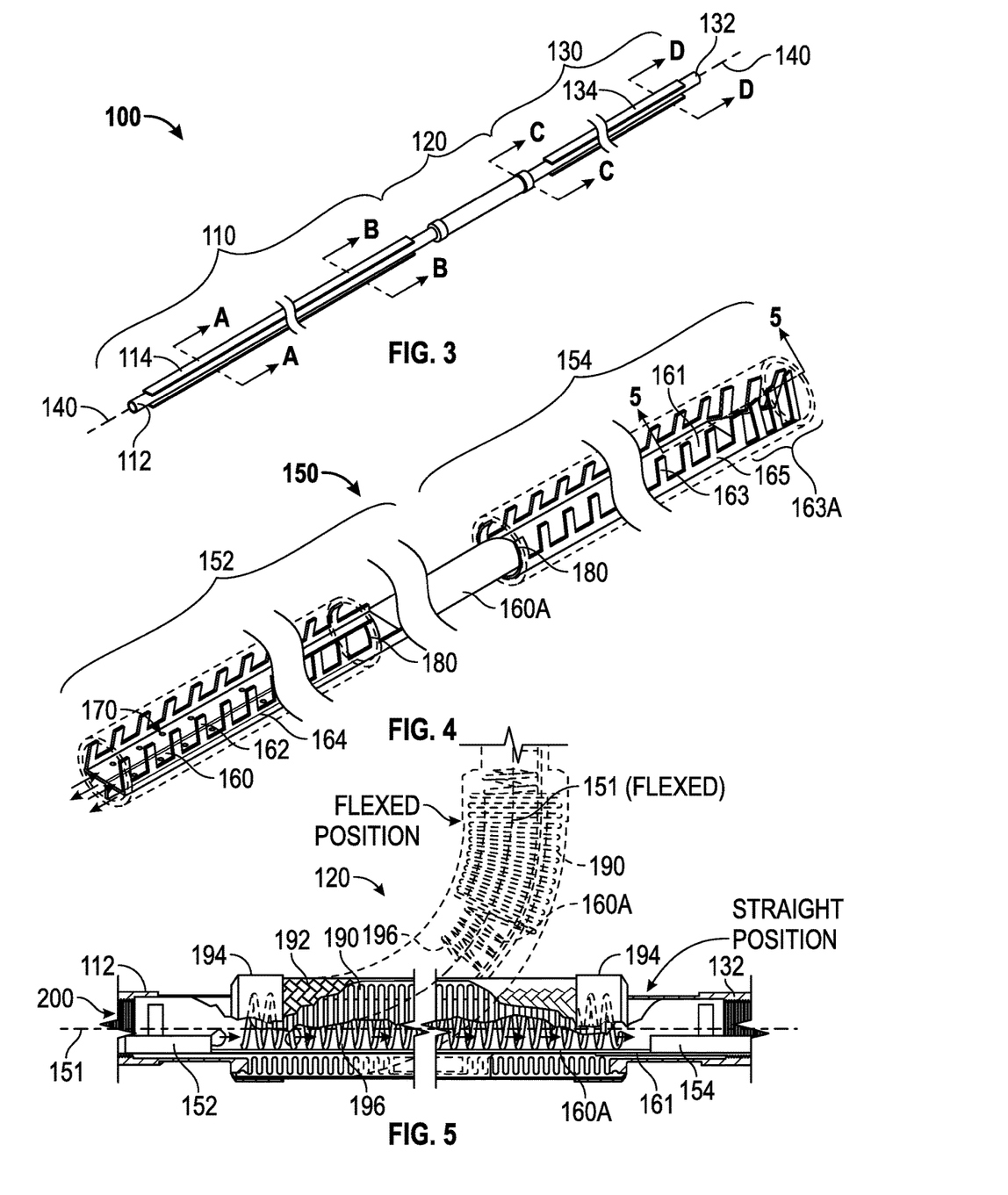
FIG. 3 is a perspective view of an exemplary heat pipe according to certain aspects of the present disclosure.
FIG. 4 is a perspective view of an exemplary wick insert according to certain aspects of the present disclosure.
FIG. 5 is a cutaway view of the flexible portion of the heat pipe of FIG. 3 in both the straight and flexed positions according to certain aspects of the present disclosure.

FIG. 3 is a perspective view of an exemplary heat pipe 100 according to certain aspects of the present disclosure. The heat pipe 100 comprises a condenser portion 110, a flexible portion 120, and a evaporator portion 130, with end caps 140 sealing the outer ends of the condenser portion 110 and the evaporator portion 130. Each of the condenser portion 110 and the evaporator portion 130 have an outer end and an inner end, wherein the inner end is closest to the other of the condenser portion 110 and the evaporator portion 130. In certain embodiments, the condenser portion 110 and the evaporator portion 130 comprise an outer tube 112, 132 that, together with the flexible portion 120, provide a single axial chamber that is, in certain embodiments, generally circular in cross-section. In certain embodiments, the tubes 112, 132 may be crimped and sealed in place of an end cap 140. The internal construction of the various portions 110, 120, and 130 is discussed below. The surfaces 114 and 134 are adapted to be thermally coupled to the panels 52 and 54, respectively, when the heat pipe 100 is assembled into a heat management system such as system 40 of FIG. 2. The labels A-A through D-D indicate the locations of cross-sectional views of FIGS. 6A-6D, respectively.

FIG. 4 is a perspective view of an exemplary wick insert 150 according to certain aspects of the present disclosure. In this embodiment, the wick insert comprises two elements 152 and 154. Element 152 comprises a separator plate 160 and a plurality of tabs 162 extending from a lower tab portion 164 on each side of the separator plate 160. Element 154 comprises a similar separator plate 161 and a plurality of tabs 163 extending from a lower tab portion 165 on each side of the separator plate 161. The wick insert element 154 comprises an inclined portion 161A and extended tabs 163A, which are discussed in greater detail with respect to FIG. 7. In this example, the separator plate 160 of element 152 comprises an extension 160A that will be disposed within the flexible portion 120 when the heat pipe 100 is assembled. In certain embodiments, the extension 160A does not have the lower tab portion 164 or the tabs 162. In certain embodiments, the extension 160A extends into the evaporator portion 130 when the heat pipe 100 is assembled and overlaps the separator plate 161 of the element 154. The function of this overlap is discussed in greater detail with respect to FIG. 5. In certain embodiments, the elements 152 and 154 each comprise attachment tabs 180 configured to be attached to the flexible portion 120 so as to locate the wick insert 150 with respect to the flexible portion 120 and prevent displacement of the wick insert 150 as the heat pipe 100 bends. The attachment of attachment tabs 180 is discussed in greater detail with respect to FIG. 6C. Vent holes 170 are visible in the separator plate 160 of the condenser portion 110, and are discussed in greater detail with respect to FIGS. 10A & 10B. The labels E-E indicate the location of the cross-sectional view shown in FIG. 7. A wick insert 150 may be particularly advantageous for use with outer tubes 112, 132 that are made from certain metals, e.g. nickel and Invar, that cannot easily be extruded with lengthwise grooves, such as shown in FIG. 11, to locate a wick insert.

FIG. 5 is a cutaway view of the flexible portion 120 of the heat pipe 100 of FIG. 3 in both the straight and flexed positions according to certain aspects of the present disclosure. The example flexible portion 120 comprises a bellows tube 190 coupled to a collar 194 at each end. In certain embodiments, the outer tubes 112, 132 of the condenser portion 110 and evaporator portion 130 are also coupled to the collars 194 when the heat pipe 100 is assembled, thereby forming the sealed single axial chamber 200. In certain embodiments, the bellows tube 190 comprises a plurality of radially outward extending convexly curved elements along the length of the bellows tube 190 which are connected to each other by concavely curved inner portions, i.e. individual bellows. In certain embodiments, the flexible portion 120 comprises a surrounding braided sleeve 192 that is also coupled to the collars 194.

The wick insert elements 152 and 154 are disposed within the outer tubes 112 and 132, respectively, and the wick insert element 152 extends through the bellow tube 190 and into the outer tube 132 where extension 160A overlaps the separator plate 161 of the wick insert 154. The wick inserts 152, 154 acts as barrier to form two distinct passages within the outer tubes 112, 132 and bellows tube 190. As the flexible portion 120 moves from the straight position to the flexed position, the elements of the flexible portion 120 bend about a neutral axis 151. Elements that are on an outer side of the neutral axis 151 will tend to stretch while elements that are on an inner side of the neutral axis 151 will tend to compress. As the separator plates 160, 161 are on the outer side of neutral axis 151, the separator plate 160 will pull away from the separator plate 161. The overlap of the extension 160A with the separator plate 161 maintains the continuity of the separator plates 160, 161 along the single axial chamber 200. The ability to maintain the continuity of the separator plates 160, 161, and therefore maintain the separation of the portions of the single axial chamber 200 that are above and below the separations plates 160, 161, is one feature that allows the assembled heat pipe 100 to be bent after fabrication while maintaining its heat transfer capability.

In the example embodiment, a spring 196 is disposed inside and constrained by the bellows 190 in the vapor-phase portion of the single axial chamber 200. The spring 196 is also constrained by the wick insert element 152. The spring 196 enables the wick insert element 152 to deform during flexure without buckling. As shown in FIG. 5, in the flexed position the bellows 190 and the spring 196 are bent so that at their radial edges the bellows 190 have a compressed inner side and an expanded outer side near the inner walls of the braided sleeve 192. Similarly, the spring 196 has an expanded radial edge and a compressed radial edge. As depicted in FIG. 5, the expanded spring radial edge is disposed against the separator plate 160 of the wick insert element 152 and the compressed spring radial edge is disposed against the bellows 190 inner diameter. It will be apparent to those of skill in the art that the flexible portion 120 may also be bent in the opposite manner where the expanded spring radial edge is disposed against the bellows 190 inner diameter and the compressed spring radial edge is disposed against the separator plate 160.

Figure 6A:
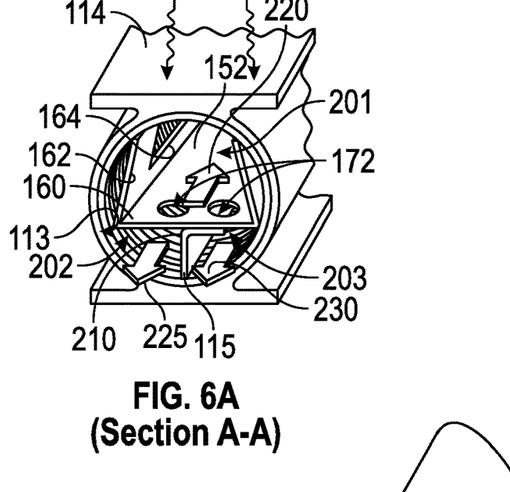
FIGS. 6A-6D are cross-sectional views of the heat pipe of FIG. 3 according to certain aspects of the present disclosure.

FIGS. 6A-6D are cross-sectional views of the heat pipe 100 of FIG. 3 according to certain aspects of the present disclosure. FIG. 6A shows the wick insert element 152 disposed within the outer tube 112 at location A-A. The wick insert 152 in the condenser portion 110 may be graded by the use of a splitter 115 that separates the liquid passage into two or more distinct sub-passages 202 and 203. The wick insert 152 contacts the inner wall of the outer tube 112, which comprises grooves 113, at the lateral corners of the separator plate 160 and the tips of the tabs 162 and the divider 115. The contact between the corners of the separator plate 160 and the grooves 113 is discussed in greater detail with respect to FIG. 6E. In operation, there will be a gas-phase flow 220 in the gas-phase passage 201 that is above the separator plate 160 and liquid-phase flows 225 and 230 in the arteries 202 and 203, respectively. The separator plate 160 has vent holes 172 in the region over the divider 115. Vent holes should have a diameter that is greater than or equal to the capillary pumping dimension of the liquid passage, which may be characterized by either the hydraulic diameter or the largest circle that can be inscribed within a cross-section of the liquid passage taken perpendicular to the tube centerline. Vent holes 172 are discussed in greater detail with respect to FIGS. 9A and 10A.

Figure 6B:
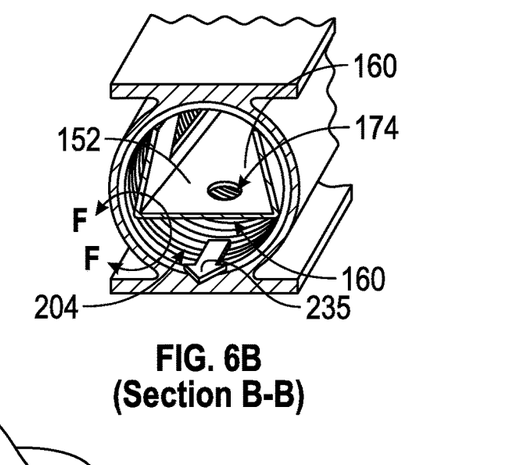

The use of splitter 115 increases the capillary pressure difference, i.e. capillary pumping, between liquid flows in sub-passages 202 and 203 and the vapor flow in gas-phase passage 201 compared to a single combined passage such as shown in FIG. 6B. The smaller liquid-phase arteries 202, 203 permit the use of smaller vent holes 172, compared to the vent hole 174 of a single liquid-phase artery. The capillary pressure is inversely proportional to the capillary pumping radius, where the capillary pumping radius is the maximum radius of curvature of the meniscus formed between the vapor and liquid phases. As the largest radius is typically at the vent holes 172, 174, the size of the vent hole determines the local capillary pressure. The increase in capillary pressure more than offsets the increased flow resistance caused by the reduction in flow area of a liquid-phase artery 202 compared to the area of a single liquid-phase artery. By placement of one or more such splitters 115, the performance of the heat pipe 100 may be optimized for any set of temperature, fluid and geometric constraints.

FIG. 6B shows the wick insert element 152 disposed within the outer tube 112 at location B-B. In the heat pipe 100 of FIG. 3, the divider 115 does not extend the full length of the condenser 110 and is not present at location B-B, leaving a single liquid-phase artery 204 that is in fluid communication with the arteries 202 and 203. In operation, there is a liquid-phase flow 235 that will divide into flows 225 and 230 when the flow 235 reaches the divider 115. In the region where there is no divider 115, the separator plate 160 has vent holes 174, which may be larger than the vent holes 172, that are discussed in greater detail with respect to FIGS. 9B and 10B. The labels F-F indicate the location of the enlarged view of FIG. 6E.

Figure 6C:
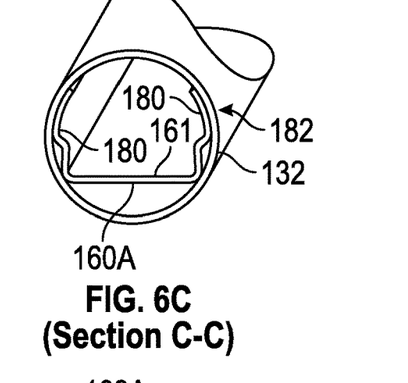

FIG. 6C depicts the attachment of the attachment tabs 180 of the wick insert element 154 to the outer tube 132 of the evaporator portion 130 by, for example, spot welds 182. Also visible is the extension 160A that, in this example, is underneath the separator plate 161 such that that extension 160A is captured between the inner wall of the outer tube 132 and the separator plate 161.

Figure 6D:
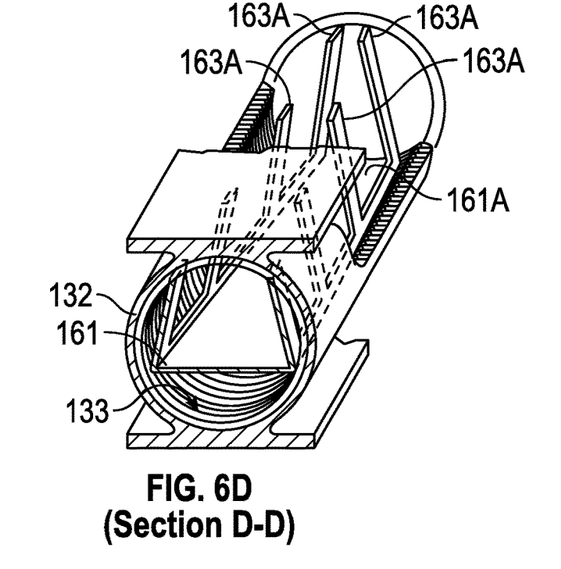

FIG. 6D is a combination of a cross-sectional view and a cutaway view of the portion of the evaporator portion 130 beyond location D-D. The outer tube 132 has grooves 133 on the inner wall, similar to the grooves 113 of outer tube 112. Beyond location D-D, the separation plate 161 has an inclined portion 161A that tapers in width to maintain contact with the grooves 133. As the inclined portion 161A of the separator plate 161 descends, the tabs 163A must be longer than tabs 163 to maintain contact at their tips with the inner wall of the outer tube 132. The inclined portion 161A of the separator plate 161 is discussed in greater detail with respect to FIG. 7.

Figure 6E:
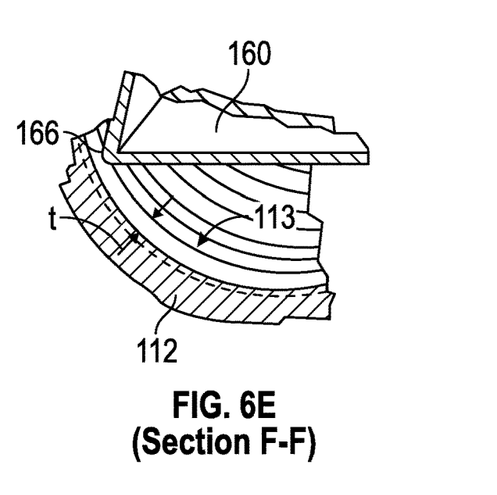
FIG. 6E is an enlargement of a detail F-F of FIG. 6B according to certain aspects of the present disclosure.

FIG. 6E is an enlargement of a detail F-F of FIG. 6B according to certain aspects of the present disclosure. In certain embodiments, the inner wall of the outer tube 112 comprises generally circumferential grooves 113. In certain embodiments, the grooves 113 are formed in a spiral pattern. In certain embodiments, the grooves have a depth "t," for example 0.13 mm (0.005 in.), chosen to transport the liquid-phase working fluid from the liquid-phase artery, for example artery 235 of FIG. 6B, around the entire circumference of the gas-phase passage 201 by capillary action of the working fluid. The separator plate 160 comprises lateral corners 166 that are generally in contact with the tops of the grooves 113 such that the only passages connecting the liquid-phase passages and the gas-phase passage 201 within the condenser portion 110 are the grooves 113. In certain embodiments, there may be a gap between a lateral corner 166 and one or more of the peaks of the grooves 113, wherein the gap is on the same order of magnitude as the grooves 113 and less than the diameter of the vent holes 172, 174 that are proximate to the particular gap. Similarly, the evaporator portion 130 has grooves 133 on the inner wall of the outer tube 132 and the corresponding corners 166 of the separator plate 161 are in contact with the tops of the grooves 133 such that the grooves 133 form the only passages connecting the liquid-phase passage 235 and the gas-phase passage 201 within the condensor portion 130.

Figure 7:
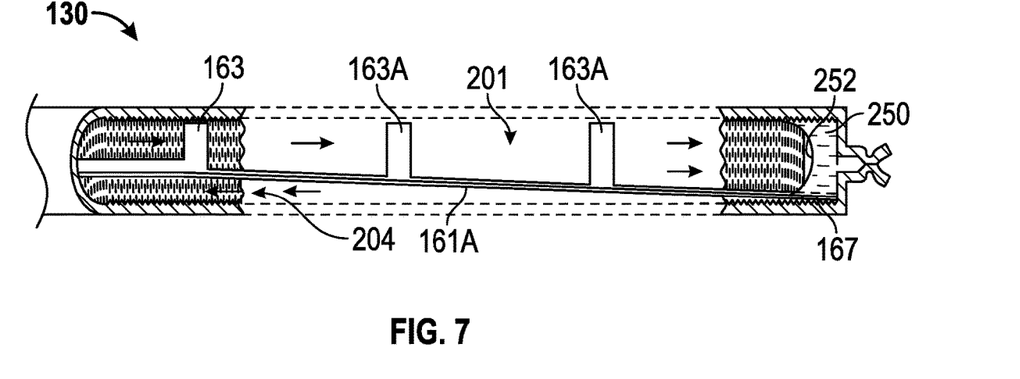
FIG. 7 is a cutaway view of a portion of the condenser portion of the heat pipe of FIG. 3 according to certain aspects of the present disclosure.

FIG. 7 is a cutaway view of a portion of the evaporator portion 130 of the heat pipe 100 of FIG. 3 according to certain aspects of the present disclosure. At the outermost end of the evaporator portion 130, an inclined portion of the separator plate 161A is tapered thereby forming a gradually larger gas-phase passage 201. The end and sides of the tapered/inclined portion of the separator plate 161A are held against the inner walls of the outer tube 132 by the longer tabs 163A. This tapered portion of the separator plate 161A permits the enlargement of a liquid slug 150 that is disposed within the end of the condenser portion 130. This enlargement of the liquid slug 150 reduces the zero-g capillary back-pressure, since the capillary pressure is inversely proportional to the radius of curvature of the meniscus 252 formed by the liquid slug 250 in the gas-phase passage 201. The increased pressure drop caused by the reduction of area in the liquid-phase artery 204 under the inclined portion of the separator plate 161A is more than offset by the increased net capillary pressure resulting from the larger radius of the meniscus 252. Such tapering may be optimized based on net heat pipe performance requirements using a variety of taper configurations. In certain embodiments, the inclined portion 161A has an outermost tip 167 that is in contact with the inner surface of the outer tube 132 such that the liquid-phase artery 204 is terminated at the outermost tip of the inclined portion 161A.

Figure 8A:
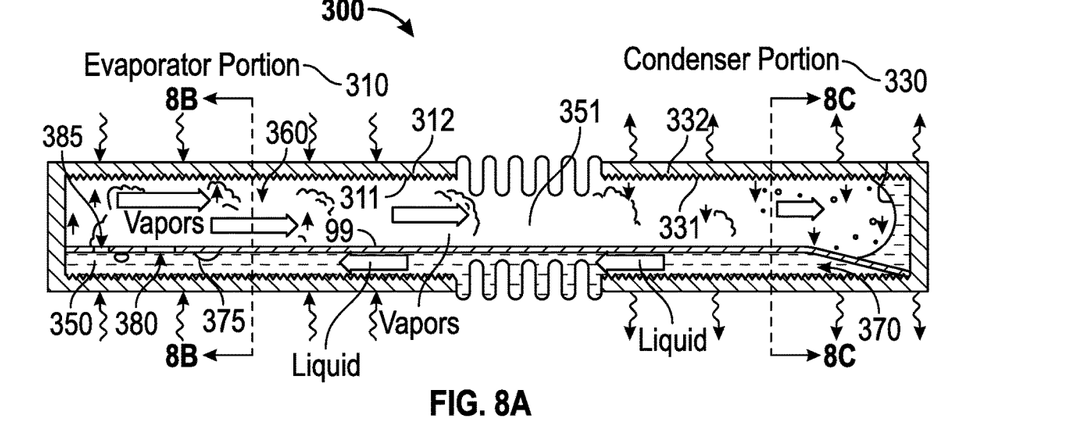
FIGS. 8A-8C are cross-sectional views of an example heat pipe illustrating the movement of the working fluid according to certain aspects of the present disclosure.

FIGS. 8A-8C are cross-sectional views of an example heat pipe 300 illustrating the movement of the working fluid according to certain aspects of the present disclosure. In the evaporator portion 310, shown in the left portion of FIG. 8A, the heat transferred to the heat pipe from the external heat source causes the liquid working fluid 350, which has followed the circumferential grooves 311 of the tube 312 to cover the inner surface of the gas-phase passage 360, to evaporate which increases the pressure of the gaseous working fluid 351 in the evaporator portion 310 thereby causing the gaseous working fluid 351 to flow towards the condenser portion 330 as indicated by the arrows labeled "VAPORS." In the condenser portion 330, the flow of heat out of the condenser portion 330, for example into the radiation panels 52 of FIG. 2, causes the gaseous working fluid 351 to condense on the grooves 331 of the tube 332 into the liquid working fluid 350 and flow along the grooves 331 into the liquid-phase artery 370. Capillary pressure differences cause the liquid working fluid 350 to flow in the liquid-phase artery 370 towards the evaporator portion 310. Bubbles 357 of non-condensable gases (NCGs) that form in the liquid working fluid 350 may escape into the gas-phase passage 360 via either the larger holes 380 or the smaller holes 385 located over a divider (not visible in FIG. 8A) at the outer end of the evaporator portion 310.

Figure 8B:
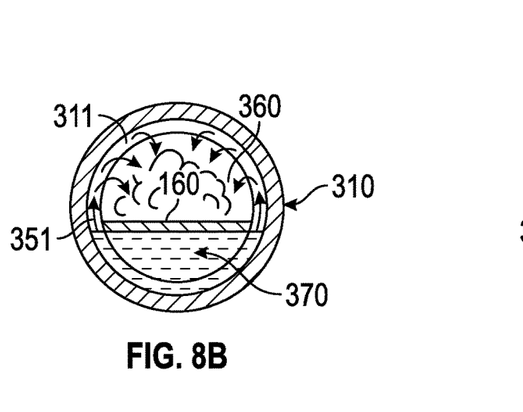

FIG. 8B is a cross-sectional view of the heat pipe 300 at location 8B-8B shown in FIG. 8A, with the view of FIG. 8B taken at right angles to the view of FIG. 8A. The gaseous working fluid 351 is passing along the grooves 311 from the liquid-phase artery 370 past the separation plate 160 into the gas-phase passage 360 as well as evaporating directly from the grooves on the inner wall of the gas-phase passage 360.

Figure 8C:
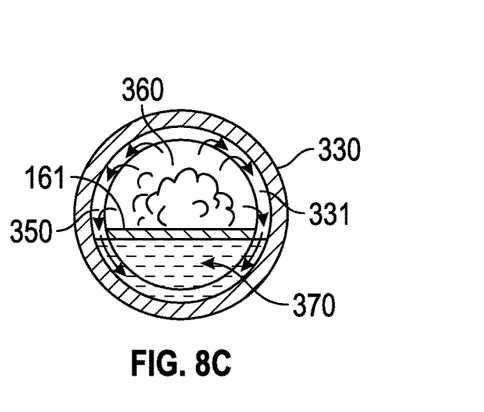

FIG. 8C is a cross-sectional view of the heat pipe 300 at location 8C-8C shown in FIG. 8A, with the view of FIG. 8C taken at right angles to the view of FIG. 8A. The liquid working fluid 350 is passing from the walls of the gas-phase passage 360, where the gaseous working fluid 351 condensed, along the grooves 331 past the separation plate 161 into the liquid-phase artery 370.

Figure 9A:
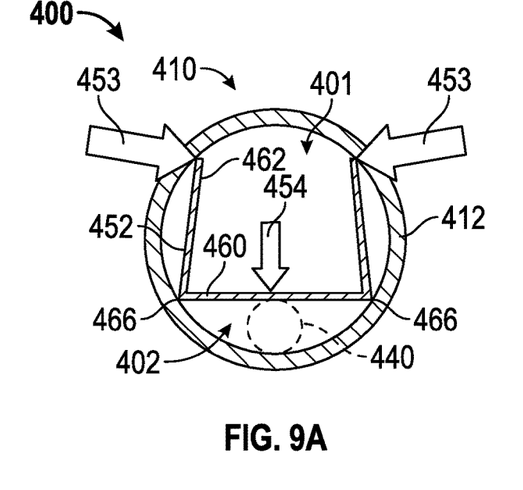
FIGS. 9A-9B are cross-sections of an example evaporation portion of a heat pipe showing the size of inscribed circles within the liquid-phase arteries according to certain aspects of the present disclosure.
Figure 9B:
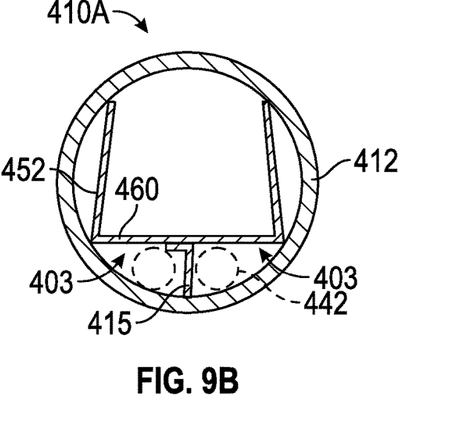

FIGS. 9A-9B are cross-sections of an example evaporation portion 410 of a heat pipe 400 showing the size of inscribed circles within the liquid-phase arteries 402, 403 according to certain aspects of the present disclosure. FIG. 9A depicts an outer tube 412 with a wick insert 452 having a separation plate 462 forming a gas-phase passage 401 and a single liquid-phase artery 402. The largest circle that can be inscribed within the cross-sectional area of the liquid-phase artery 402 is shown as the dashed-line circle 440.

When the wick insert 452 is installed into the tube 412, the tips of the plurality of tabs 462 are displaced inward while in contact with the inner surface of the tube 412 such that reaction forces 453 applied by the tube to the tips of the plurality of tabs 462 together provide a net downward force 454 on the wick insert 452. This downward force serves to maintain the lateral edges 466 in contact with or proximate to the inner surface of the tube 412.

FIG. 9B depicts an evaporation portion 410A similar to the evaporation portion 410 of FIG. 9A with the addition of a divider 415 disposed beneath separation plate 462 so as to form two separate liquid-phase arteries 403 that are, in this example, of equal size. In certain embodiments, the liquid-phase arteries may be of different sizes. The largest circles that can be inscribed within the cross-sectional area of each of the liquid-phase arteries 403 are shown as the dashed-line circles 442, which are smaller than the circle 440 for a comparable configuration of a separator plate 460 within a tube 412.

Figure 10A:
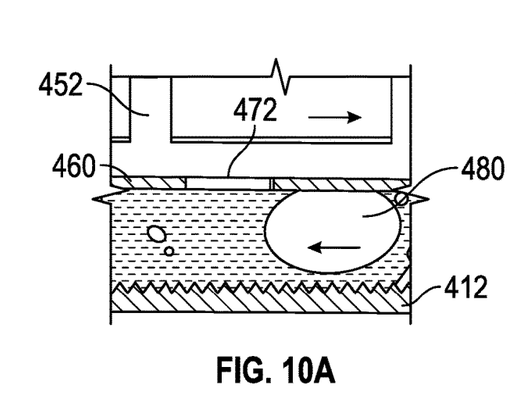
FIGS. 10A-10B are cross-sectional side views of the example heat pipe illustrating exemplary vent holes according to certain aspects of the present disclosure.
Figure 10B:
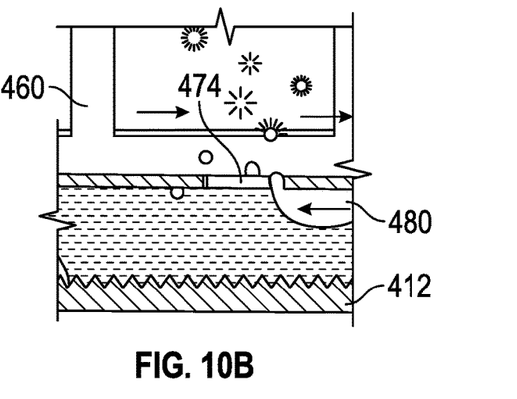
Figure 11:
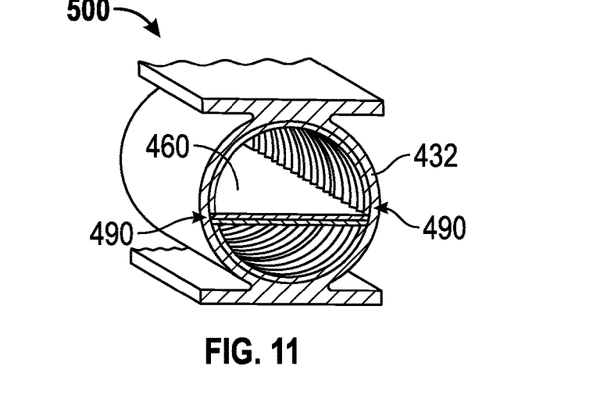
FIG. 11 depicts an alternate configuration of a heat pipe according to certain aspects of the present disclosure.

FIGS. 10A-10B are cross-sectional side views of the example heat pipe 400 illustrating exemplary vent holes 472, 474 according to certain aspects of the present disclosure. FIG. 10A corresponds to the evaporation portion 410 of FIG. 9A, having a single liquid-phase artery 402. The largest spherical bubble 480 that can form in the liquid-phase artery 402 will be approximately equal to the largest inscribed circle 440 depicted in FIG. 9A. In order to reliably release the bubble 480 into the gas-phase passage 401 before the bubble 480 becomes elongated, i.e. the bubble 480 becomes longer along the liquid-phase artery 402 that the bubble 480 is wide, the vent hole 472 must be is greater than or equal to the capillary pumping dimension of the liquid-phase passage 402, which may be characterized by either the hydraulic diameter of the liquid-phase artery 402 or the largest circle 440 that can be inscribed within a cross-section of the liquid-phase artery 402 of FIG. 9A. Once a generally spherical bubble 480 touches both the inner wall of the outer tube 412 and the separator plate 460, the bubble's resistance to movement may increase significantly and may become fixed in the liquid-phase artery 402, thereby blocking the liquid-phase artery 402 and causing the heat pipe 400 to function at a reduced level of performance or, if the bubble 480 completely blocks flow through the liquid-phase artery 402, to stop working altogether. In certain embodiments, the vent hole 472 is circular and the diameter of the vent hole 472 must be greater than or equal to a diameter of the inscribed circle 440. Multiple vent holes 472 may be placed along the liquid-phase artery 402 to provide multiple opportunities for the bubble 480 to vent as the bubble 480 progresses down the liquid-phase artery 402, but a single vent hole 472 may be sufficient, in certain embodiments, to maintain proper heat pipe operation.

FIG. 10B corresponds to the evaporation portion 410A of FIG. 9B, having two liquid-phase arteries 403 separated by a divider 415. Similar to the embodiment of FIG. 10A, the vent hole 474 must be at least the same size as the largest inscribed circle 442 of FIG. 9B in order to reliably release the bubble 480 into the gas-phase passage 401 before the bubble 480 becomes elongated within the liquid-phase arteries 403. In certain embodiments, the vent hole 474 is circular and the diameter of the vent hole 474 must be greater than or equal to the capillary pumping dimension of the liquid-phase arteries 403, which may be characterized by either the hydraulic diameter of the liquid-phase arteries 403 or the largest circle 442 that can be inscribed within a cross-section of the liquid-phase artery 403. In the graded configuration of FIG. 10B, each separate passage 403 must have at least one vent hole 474 to maintain operability in the presence of gas bubbles 480. The diameters of the vent holes 474 may be smaller than the diameter of the vent hole 473 in the single liquid-phase artery of FIG. 10A.

FIG. 11 depicts an alternate configuration of a heat pipe 500 according to certain aspects of the present disclosure. Two narrow and opposing indents 490 penetrate outwards into the walls 432 of one or both of the condenser portion 110 and the evaporator portion 130. Each indent 490 provides a relatively small gap on the container internal surface into which a wick insert 490 is placed and retained. In the evaporator portion 130, the wick insert extension 492 may fit under the wick insert 490, similar to the configuration of extension 160A and separator plate 161 shown in FIG. 4, and into the same indents 490.

Figure 12A:
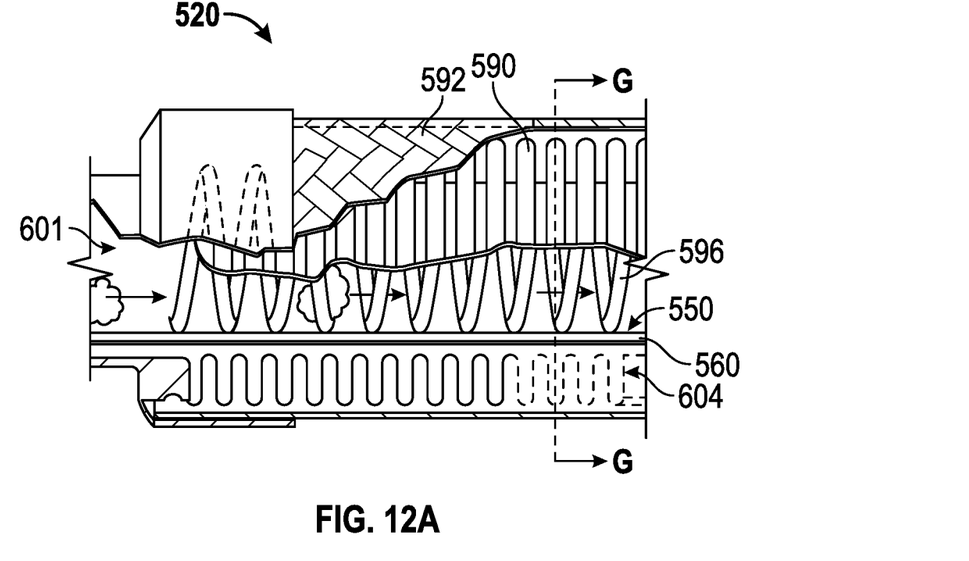
FIGS. 12A-12C depict an exemplary configuration of a wick insert within a bellows tube in a flexible portion of a heat pipe according to certain aspects of the present disclosure.
Figure 12B:
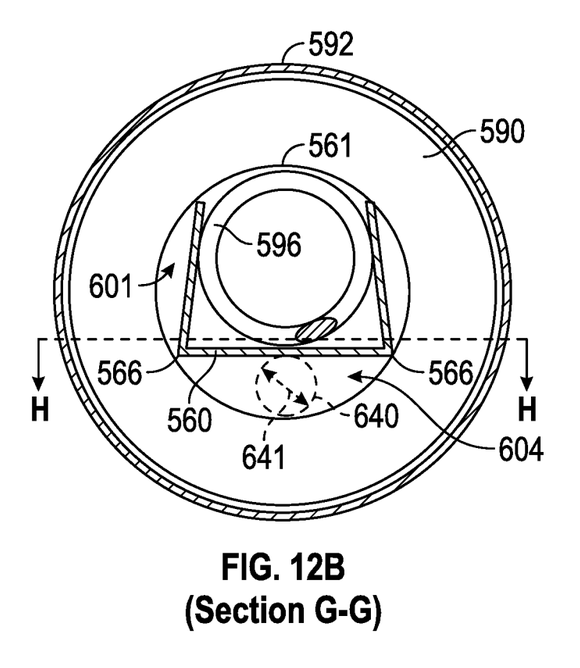
Figure 12C:
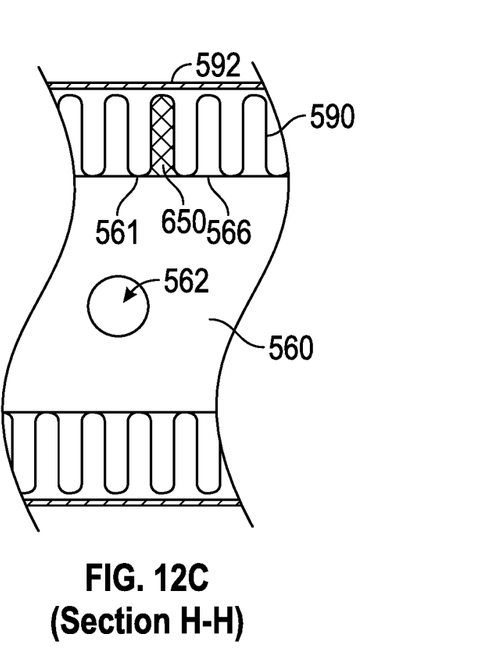

FIGS. 12A-12C depict an exemplary configuration of a wick insert 550 within a bellows tube 590 in a flexible portion 520 of a heat pipe according to certain aspects of the present disclosure. FIG. 12A depicts a partial cutaway view of a flexible portion 520 of a heat pipe, showing a braided sleeve 592 surrounding a bellows tube 590 within which is disposed a wick insert 550 and a spring 596, similar to the flexible portion 120 of FIG. 5. The separator plate 560 of the wick insert 550 separates the gas-phase passage 601 from the liquid-phase artery 604. The labels G-G indicate the location of the view of FIG. 12B.

FIG. 12B is a cross-sectional view of the complete flexible portion 520. The lateral corners 566 of the separator plate 560 are generally in contact with the inner edges 561 of the individual bellows that form the bellows tube 590, wherein this line of contact separates the gas-phase passage 601 from the liquid-phase artery 604. The dashed-line circle 640 represents the largest inscribed circle that can be formed within the liquid-phase artery 604, with the circle 640 having a diameter 641. The labels H-H indicate the location of the view of the flexible portion 520 of FIG. 12B that is shown in FIG. 12C.

FIG. 12C is a cross-section view of the complete flexible section 520 of FIG. 12A as indicated by the labels H-H in FIG. 12B. The corner 566 of the separator plate 560 is generally in contact with the inner edges 561, thus creating an opening 650, one of which is shown as a cross-hatched area in FIG. 12C, on each side of each individual bellows, i.e. the individual convolution of the bellows tube 590 that connects the gas-phase passage 601 to the liquid-phase artery 604. The size of the opening 650 must be limited to have less effect on the pumping characteristics of the liquid-phase artery 604 than the vent hole 562 formed in the separation plate 560. While the vent opening 562 is circular and have a minimum diameter equal or greater than the diameter 641 of the inscribed circle 640 shown in FIG. 12B, in this example, the opening 650 is not a circular shape and so does not have a single "diameter." The opening 650 does have a "hydraulic diameter," however, and the effect of the opening 650 on the pumping characteristics of the liquid-phase artery 604 will be less than that of the vent hole 562 having a diameter 641 if the hydraulic diameter of the opening 650 is less than the diameter 641. The thickness and depth of the individual bellows of the bellows tube 590 are therefore based at least partially on achieving a hydraulic diameter for the openings 650 that is less than the diameter 641 of largest circle 640 that can be inscribed in the liquid-phase artery 604.

Figure 13A:
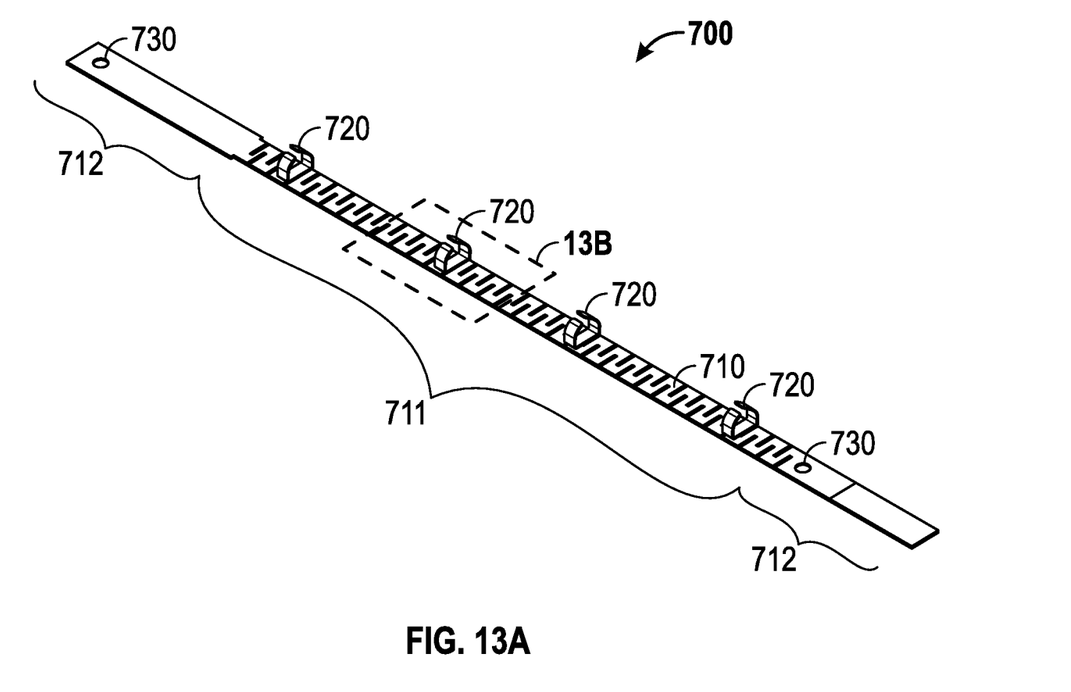
FIGS. 13A-13B depict another embodiment of a flexible wick insert that can be bent in multiple directions according to certain aspects of the present disclosure.
Figure 13B:
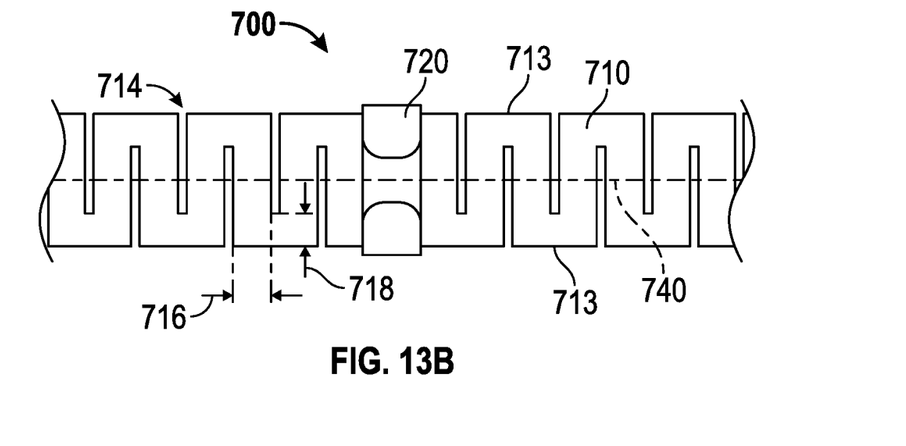

FIGS. 13A-13B depict another embodiment of a flexible wick insert 700 that can be bent in multiple directions according to certain aspects of the present disclosure. FIG. 13A is a perspective view of the wick insert 700 that is comprises of a separation plate 710 with, in this embodiment, vent holes 730 formed in the solid portions 712 on either side of the flexible portion 711. This embodiment includes several tabs 720 spaced along the wick insert 700 that serve to hold the wick insert in place within a bellows tube, e.g. the bellows tube 590 of FIG. 12A, in place of the spring 596. In certain embodiments, the tabs 720 are used with a spring, e.g. the spring 596 of FIG. 12A. A portion 13B of the wick insert 700 is enlarged in FIG. 13B. In certain embodiments, the tabs 720 are welded to the separation plate 710. In certain embodiments, the tabs 720 may be coupled to the separation plate using other attachment methods known to those of skill in the art, e.g. mechanically interlocking, brazing, soldering, etc.

FIG. 13B shows a portion of the wick insert 700 where a plurality of slots 714 alternately extend inward from the lateral edges 713 to create a serpentine form in the separation plate 710. The portions of the serpentine form that are aligned parallel to a centerline 740 of the separation plate 710 have a first width 718. The portions of the serpentine form that are perpendicular to the centerline 740 have a second width 716. In certain embodiments, the slots 714 extend past the centerline 740. In certain embodiments, the first and second widths 718, 716 are approximately equal. In certain embodiments, the first width 718 is less than the second width 716. The slots 714 increase the lateral flexibility of the wick insert 700 in a plane that is parallel to the separation plate 710 and passes through both lateral edges 713. In certain embodiments, a flexible portion of a heat pipe that includes the wick insert 700 may be locally bent in any plane that passes through the centerline 740. In certain embodiments, a flexible portion of a heat pipe that includes the wick insert 700 may be sequentially bent along its length in different planes that each pass through the centerline 740.

In certain embodiments, the portion of the wick insert 700 that is located within a condenser portion or evaporator portion, e.g. sections 110, 130 of heat pipe 100 in FIG. 3, may have slots 714 such that the condenser portion or evaporator portion can be bent or formed into a particular shape after assembly. The degree of flexibility and the minimum radius of curvature that can be achieved while bending either the rigid condenser or evaporator portions or the flexible portion of a heat pipe may be a function of one or more of the spacing and the length of the slots.

The disclosed examples of a heat pipe are particularly suitable for use in a low-gravity environment. The use of vent holes having diameters that are greater than or equal to the largest circle that can be inscribed in the liquid-phase artery located below the respective vent hole reduces the likelihood of a gas bubble obstructing the artery by venting such gas bubbles before they become lodged in the artery. The use of dividers to create multiple small liquid-phase arteries in place of a single, larger liquid-phase artery improves the heat transfer capability of a heat pipe by grading the pumping characteristics of the liquid-phase arteries.

This application includes description that is provided to enable a person of ordinary skill in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. It is understood that the specific order or hierarchy of steps or blocks in the processes disclosed is an illustration of exemplary approaches. Based upon design preferences, it is understood that the specific order or hierarchy of steps or blocks in the processes may be rearranged. The accompanying method claims present elements of the various steps in a sample order, and are not meant to be limited to the specific order or hierarchy presented. Thus, the claims are not intended to be limited to the aspects shown herein, but is to be accorded the full scope consistent with the language claims.

Headings and subheadings, if any, are used for convenience only and do not limit the invention.

Reference to an element in the singular is not intended to mean "one and only one" unless specifically so stated, but rather "one or more." Use of the articles "a" and "an" is to be interpreted as equivalent to the phrase "at least one." Unless specifically stated otherwise, the terms "a set" and "some" refer to one or more.

Terms such as "top," "bottom," "upper," "lower," "left," "right," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Although the relationships among various components are described herein and/or are illustrated as being orthogonal or perpendicular, those components can be arranged in other configurations in some embodiments. For example, the angles formed between the referenced components can be greater or less than 90 degrees in some embodiments.

Although various components are illustrated as being flat and/or straight, those components can have other configurations, such as curved or tapered for example, in some embodiments.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "operation for."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such as an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Although embodiments of the present disclosure have been described and illustrated in detail, it is to be clearly understood that the same is by way of illustration and example only and is not to be taken by way of limitation, the scope of the present invention being limited only by the terms of the appended claims.

What is claimed is:

1. An evaporator portion of a heat pipe, the evaporator portion comprising:
    a tube comprising an interior volume and an inner surface;
    a separator plate disposed within the tube and comprising two lateral edges that contact the inner surface of the tube so as to divide the interior volume into a gas-phase passage and a liquid-phase artery, wherein the separator plate comprises a plurality of tabs projecting toward the gas-phase passage from both of the lateral edges of the separator plate, each tab comprising a tip that contacts the inner surface of the tube, wherein the tabs are configured to urge the separator plate downward so as to maintain the two lateral edges proximate to the inner surface of the tube; and
    a vent hole formed through the separator plate so as to connect the gas-phase passage to the liquid-phase artery, the vent hole comprising a diameter that is greater than or equal to a diameter of the largest circle that is inscribed within the liquid-phase artery in a cross-section of the tube taken perpendicular to a centerline of the tube in an axial direction of the tube.

2. The evaporator portion of claim 1, wherein:
    the tube comprises a plurality of grooves formed in a circumferential pattern in the inner surface;
    the plurality of grooves comprises a plurality of peaks disposed between adjacent grooves; and
    the lateral edges of the separator plate contact the plurality of peaks such that the grooves form a plurality of passages that connect the gas-phase passage to the liquid-phase artery.

3. The evaporator portion of claim 1, further comprising a splitter disposed within the liquid-phase artery in contact with the separator plate and the inner surface of the tube so as to divide the liquid-phase artery into a plurality of liquid-phase subarteries.

4. An evaporator portion of a heat pipe, the evaporator portion comprising:
    a tube comprising an interior volume and an inner surface; and
    a separator plate disposed within the tube and comprising two lateral edges that are proximate to the inner surface of the tube so as to divide the interior volume into a gas-phase passage and a liquid-phase artery, wherein the separator plate comprises a plurality of tabs projecting toward the gas-phase passage from both of the lateral edges of the separator plate, each tab comprising a tip that is proximate to the inner surface of the tube, wherein the tabs are configured to urge the separator plate downward so as to maintain the two lateral edges proximate to the inner surface of the tube.

5. The evaporator portion of claim 4, wherein at least a portion of the tips of the plurality of tabs are in contact with the inner surface of the tube.

6. An evaporator portion of a heat pipe, the evaporator portion comprising:
    a tube comprising an interior volume and an inner surface;
    a separator plate disposed within the tube and comprising two lateral edges that are proximate to the inner surface of the tube so as to divide the interior volume into a gas-phase passage and a liquid-phase artery; and
    a splitter disposed within the liquid-phase artery in contact with the separator plate and the inner surface of the tube so as to divide the liquid-phase artery into a plurality of liquid-phase subarteries, wherein the splitter has a length that is less than a length of the tube and the splitter is disposed at a first end of the tube such that there is a single liquid-phase artery at a second end of the tube and a plurality of subarteries at the first end of the tube.

7. The evaporator portion of claim 6, further comprising:
    a first vent hole formed through the separator plate so as to connect the gas-phase passage to the single liquid-phase artery, the first vent hole comprising a first diameter that is greater than or equal to a diameter of the largest circle that is inscribed within the single liquid-phase artery in a cross-section of the tube taken through the single liquid-phase artery perpendicular to a centerline of the tube in an axial direction of the tube; and
    a plurality of second vent holes formed through the separator plate so as to respectively connect the gas-phase passage to one of the plurality of subarteries, each of the plurality of second vent holes comprising a second diameter that is greater than or equal to a diameter of the largest circle that is inscribed within the respective one of the plurality of subarteries in a cross-section of the tube taken through the plurality of subarteries perpendicular to the centerline.

8. The evaporator portion of claim 7, wherein the second diameter is less than the first diameter.

9. An evaporator portion of a heat pipe, the evaporator portion comprising:
    a tube comprising an interior volume and an inner surface;
    a separator plate disposed within the tube and comprising two lateral edges that contact the inner surface of the tube so as to divide the interior volume into a gas-phase passage and a liquid-phase artery;
    a vent hole formed through the separator plate so as to connect the gas-phase passage to the liquid-phase artery, the vent hole comprising a diameter that is greater than or equal to a diameter of the largest circle that is inscribed within the liquid-phase artery in a cross-section of the tube taken perpendicular to a centerline of the tube in an axial direction of the tube; and
    a splitter disposed within the liquid-phase artery in contact with the separator plate and the inner surface of the tube so as to divide the liquid-phase artery into a plurality of liquid-phase subarteries, wherein the splitter has a length that is less than a length of the tube and the splitter is disposed at a first end of the tube such that there is a single liquid-phase artery at a second end of the tube and a plurality of subarteries at the first end of the tube.

10. The evaporator portion of claim 9, wherein:
the tube comprises a plurality of grooves formed in a circumferential pattern in the inner surface;
the plurality of grooves comprises a plurality of peaks disposed between adjacent grooves; and
the lateral edges of the separator plate contact the plurality of peaks such that the grooves form a plurality of passages that connect the gas-phase passage to the liquid-phase artery.

11. An evaporator portion of a heat pipe, the evaporator portion comprising:
a tube comprising an interior volume and an inner surface;
a separator plate disposed within the tube and comprising two lateral edges that contact the inner surface of the tube so as to divide the interior volume into a gas-phase passage and a liquid-phase artery;
a vent hole formed through the separator plate so as to connect the gas-phase passage to the liquid-phase artery, the vent hole comprising a diameter that is greater than or equal to a diameter of the largest circle that is inscribed within the liquid-phase artery in a cross-section of the tube taken perpendicular to a centerline of the tube in an axial direction of the tube; and
a splitter disposed within the liquid-phase artery in contact with the separator plate and the inner surface of the tube so as to divide the liquid-phase artery into a plurality of liquid-phase subarteries, wherein the vent hole comprises:
a first vent hole formed through the separator plate so as to connect the gas-phase passage to the liquid-phase artery, the first vent hole comprising a first diameter that is greater than or equal to a diameter of the largest circle that is inscribed within the liquid-phase artery in a cross-section of the tube taken through the liquid-phase artery perpendicular to the centerline of the tube in the axial direction of the tube; and
a plurality of second vent holes formed through the separator plate so as to respectively connect the gas-phase passage to one of the plurality of subarteries, each of the plurality of second vent holes comprising a second diameter that is greater than or equal to a diameter of the largest circle that is inscribed within the respective one of the plurality of subarteries in a cross-section of the tube taken through the plurality of subarteries perpendicular to the centerline of the tube in the axial direction of the tube.

12. The evaporator portion of claim 11, wherein the second diameter is less than the first diameter.

13. The evaporator portion of claim 11, wherein:
the tube comprises a plurality of grooves formed in a circumferential pattern in the inner surface;
the plurality of grooves comprises a plurality of peaks disposed between adjacent grooves; and
the lateral edges of the separator plate contact the plurality of peaks such that the grooves form a plurality of passages that connect the gas-phase passage to the liquid-phase artery.

\* \* \* \* \*